US009317348B2

(12) United States Patent
Stapleton

(10) Patent No.: US 9,317,348 B2
(45) Date of Patent: Apr. 19, 2016

(54) INTEGRATED-CIRCUIT RADIO

(71) Applicant: NORDIC SEMICONDUCTOR ASA, Trondheim (NO)

(72) Inventor: Joel David Stapleton, Trondheim (NO)

(73) Assignee: NORDIC SEMICONDUCTOR ASA, Trondheim (NO)

( * ) Notice: Subject to any disclaimer, the term of this patent is extended or adjusted under 35 U.S.C. 154(b) by 273 days.

(21) Appl. No.: 13/924,160

(22) Filed: Jun. 21, 2013

(65) Prior Publication Data
US 2014/0007141 A1 Jan. 2, 2014

(30) Foreign Application Priority Data
Jun. 27, 2012 (GB) .................................. 1211423.7

(51) Int. Cl.
*G06F 9/54* (2006.01)
*G06F 9/445* (2006.01)

(52) U.S. Cl.
CPC ........ *G06F 9/547* (2013.01); *G06F 8/65* (2013.01); *G06F 9/44521* (2013.01)

(58) Field of Classification Search
None
See application file for complete search history.

(56) References Cited

U.S. PATENT DOCUMENTS

| | | | |
|---|---|---|---|
| 6,223,275 B1 * | 4/2001 | Goto et al. ................ 712/200 |
| 6,874,069 B2 | 3/2005 | Lin et al. |
| 7,237,121 B2 | 6/2007 | Cammack et al. |
| 8,127,064 B2 * | 2/2012 | Girard et al. ............. 710/264 |
| 8,176,488 B1 * | 5/2012 | Dobrovolskiy et al. ........ 718/1 |
| 2005/0177667 A1 * | 8/2005 | Kimelman et al. ........... 710/260 |
| 2005/0193156 A1 * | 9/2005 | Inoue et al. ................... 710/260 |
| 2012/0255031 A1 * | 10/2012 | Sallam ........................... 726/27 |
| 2012/0272033 A1 * | 10/2012 | Murphy et al. ............... 711/171 |
| 2012/0304120 A1 * | 11/2012 | Gelling ........................ 715/810 |

FOREIGN PATENT DOCUMENTS

DE 3632139 A1 9/1986

OTHER PUBLICATIONS

Peterh5322, Supervisor Call instruction, Jun. 23, 2011, Wikipedia, pp. 1-2.*

(Continued)

*Primary Examiner* — Emerson Puente
*Assistant Examiner* — Zhi Chen
(74) *Attorney, Agent, or Firm* — Koppel, Patrick, Heybl & Philpott

(57) ABSTRACT

An integrated-circuit radio communication device (1) comprises a processor (7), memory (13), and radio communication logic (17). The memory (13) has a firmware module (23) stored at a firmware memory address, the firmware module (23) comprising instructions for controlling the radio communication logic (17) according to a predetermined radio protocol. The processor (7) is configured to receive supervisor call instructions, each having an associated supervisor call number, and to respond to a supervisor call instruction by (i) invoking a supervisor call handler in the firmware module (23), and (ii) making the supervisor call number available to the call handler. A software application (27) is loaded into the memory (13) of the device (1), and stored at a predetermined application memory address. It is arranged to invoke a radio communication function from the firmware module (23) by issuing a supervisor call instruction having an associated predetermined supervisor call number corresponding to the function to be invoked.

23 Claims, 8 Drawing Sheets

(56) References Cited

OTHER PUBLICATIONS

ARM Holdings, Cortex™-M3 Technical Reference Manual, 2006, ARM Holdings, p. 5-14.*
Sierra Wireless Open AT Tutorial, Programing guide, 508 pages.
Open AT OS. "The standard C wireless operating system", info sheets. 4 pages.
US Publication No. 2009/0318078 A1 (Girard, et al.), published Dec. 24, 2009.
US Publication No. 2011/0117956 A1 (Levi, et al.) published May 19, 2011.
US Publication No. 2003/0056107 A1 (Cammack, et al.) published Mar. 20, 2003.
US Publication No. 2006/0150255 A1 (Ceskutti), published Jul. 6, 2006.
US Publication No. 2008/126779 A1 (Smith), published May 29, 2008.
Application Note 179 "Cortex-M3 Embedded Software Development", ARM, Mar. 2007.
Lee, Sang-Yeob et al.; "Zikimi: A Case Study in Micro Kernel Design for Multimedia Applications"; Multimedia Tools and Applications; vol. 27; 2005; pp. 351-366.

* cited by examiner

INTEGRATED-CIRCUIT RADIO

This invention relates to integrated-circuit radio-communication devices and methods of configuring such devices.

Integrated-circuit radio-communication devices typically integrate a processor, memory and radio communication logic on a silicon chip. An antenna may be fabricated on the silicon or may be connecting externally. The device will have pins for connecting to a power supply, clock source and any external peripherals such as sensors, timers, digital-to-analog converters and output devices. The processor interfaces with the radio communication logic in order to supervise the sending and/or receiving of radio messages.

Such radio-communication devices, or chips, can be used in a wide range of wireless products, such as wireless mice and keyboards, controllers for game consoles, bicycle speedometers, remote controls, garage-door openers, wireless loudspeakers, etc.

The processor on such a device may run software directly from non-volatile memory in order to control the radio communication logic according to a predetermined radio protocol, such as Bluetooth® or ZigBee®.

The manufacturing of a complete product, such as a wireless mouse, that incorporates such a radio-communication chip typically involves the manufacturer of the radio chip supplying it to a product manufacturer, who will integrate the chip into the rest of the product. The chip manufacturer may also provide a development kit, containing tools, such as a cross compiler, loader and debugger, and documentation that allow the product manufacturer to develop, install and debug custom application software for the radio device. The custom application software may, for instance, include routines for receiving input from a movement sensor on a wireless mouse and for transmitting suitable radio messages according to a desired protocol.

A development kit may additionally include source code for a software library and/or operating system, written by the chip manufacturer. The product manufacturer can then compile and link the supplied source code with its own custom software application, to create a single object file for loading to a predetermined address in the memory of each chip.

The library or operating system may contain instructions that implement a particular radio protocol. It could include other functions, such as memory management, processor scheduling, inter-process communication, etc. The application developer can call these supplied functions from its application code, rather than having to write them from scratch. This can make development of the application software simpler and quicker. It can also ease portability between different models of the radio chip.

The applicant has come to realise, however, that such traditional approaches can be improved upon.

From one aspect, the invention provides a method of configuring an integrated-circuit radio communication device, wherein:
- the device comprises a processor, memory, and radio communication logic;
- the memory has a firmware module stored at a firmware memory address, the firmware module comprising instructions for controlling the radio communication logic according to a predetermined radio protocol; and
- the processor is configured to receive supervisor call instructions, each having an associated supervisor call number, and to respond to a supervisor call instruction by (i) invoking a supervisor call handler in the firmware module, and (ii) making the supervisor call number available to the call handler, the method comprising loading a software application into the memory of the device, such that the application is stored at a predetermined application memory address, wherein the software application is arranged to invoke a radio communication function from the firmware module by issuing a supervisor call instruction having an associated predetermined supervisor call number corresponding to the function to be invoked.

Thus it will be seen by those skilled in the art that, in accordance with the invention, a software application can be loaded onto a radio-communication chip so as to interface via supervisor call instructions with a firmware module that provides radio control functions.

This removes the need for the software application developer to link the application code with a library or operating system supplied by the chip manufacturer, thereby resulting in a simpler and more efficient development process. By avoiding the need for link-time dependencies, the chances of bugs arising during development of the software application can be reduced. Because there is no need to keep re-linking the firmware module that provides radio control functions at successive development stages, the location of member objects in memory can remain unchanged during the development process. This continuity in memory location can avoid bugs occurring and can also aid debugging if errors do arise.

In preferred embodiments, the firmware module, stored at the firmware memory address, is a linked binary. Thus no linking between the firmware module and the software application is required, or is even possible. It is envisaged that the firmware module will usually be a compiled binary module (e.g. compiled from the C programming language), although it is possible that it could be assembled directly from machine code.

In order to develop the software application, the only non-standard information (i.e. not determined by the processor or device architecture) that the application developer need know is: the predetermined software-application memory address; information relating to the amount of any data memory (e.g. in RAM) available for the software application to use, and the predetermined correspondence between supervisor call numbers and radio communication functions in the firmware module. This information can be sufficient to write, compile and load a software application for the device. It is envisaged that the application developer could conveniently be provided with a header file (e.g. in the C programming language) which would contain this information. (Such a header file may, of course, optionally contain other, additional features to provide further assistance to the application developer.)

Another advantage of configuring a device according to methods of the invention is that the device manufacturer need not reveal confidential source code in its firmware module to the application developer.

The integrated-circuit device may be provided to a developer of the software application with the firmware module already pre-loaded on the device. This can further increase the security of any confidential information contained in the firmware module. However, this is not essential. The application developer may instead receive the firmware module as a binary image of pre-compiled instructions and load the firmware module onto the device.

Thus, from a further aspect, the invention provides a method of configuring an integrated-circuit radio communication device, wherein the device comprises a processor, memory, and radio communication logic, the method comprising:

loading a software application into the memory of the device, such that the application is stored at a predetermined application memory address; and loading a firmware module into the memory of the device, such that the firmware module is stored at a predetermined firmware memory address, the firmware module comprising instructions for controlling the radio communication logic according to a predetermined radio protocol, wherein:

the processor is configured to receive supervisor call instructions, each having an associated supervisor call number, and to respond to a supervisor call instruction by (i) invoking a supervisor call handler in the firmware module, and (ii) making the supervisor call number available to the call handler; and the software application is arranged to invoke a radio communication function from the firmware module by issuing a supervisor call instruction having an associated predetermined supervisor call number corresponding to the function to be invoked.

The firmware module and the software application may be loaded onto the device in any order or substantially simultaneously. It will be appreciated that loading the two simultaneously is still fundamentally different from loading a single, linked software application and library as the skilled person might have done in the past. As before, the firmware module is preferably a compiled and linked binary module (but without being linked to the software application).

The invention also extends to an integrated-circuit radio communication device itself.

Thus, from a third aspect, the invention provides an integrated-circuit radio communication device, wherein:

the device comprises a processor, memory, and radio communication logic;

the memory has a firmware module stored at a firmware memory address, the firmware module comprising instructions for controlling the radio communication logic according to a predetermined radio protocol; and the processor is configured to receive supervisor call instructions, each having an associated supervisor call number, and to respond to a supervisor call instruction by (i) invoking a supervisor call handler in the firmware module, and (ii) making the supervisor call number available to the call handler;

the memory has a software application stored at a predetermined application memory address, the software application being arranged to invoke a radio communication function from the firmware module by issuing a supervisor call instruction having an associated predetermined supervisor call number corresponding to the function to be invoked.

From further aspects, the invention provides a firmware module, and a transitory or non-transitory medium storing the same, for loading on an integrated-circuit radio communication device comprising a processor, memory, and radio communication logic, at a firmware memory address, the firmware module comprising:

instructions for controlling the radio communication logic according to a predetermined radio protocol; and a supervisor call handler arranged to respond to a supervisor call instruction being issued by a software application by performing a radio communication function corresponding to a supervisor call number associated with the supervisor call instruction.

The firmware module is preferably a linked binary module.

From still further aspects, the invention provides a software application, and a transitory or non-transitory medium storing the same, for loading on an integrated-circuit radio communication device comprising a processor, memory, and radio communication logic, at a predetermined software application memory address, the software application being arranged to invoke a radio communication function by issuing a supervisor call instruction having an associated, predetermined supervisor call number corresponding to the function to be invoked.

In preferred embodiments of any of the above aspects, the firmware module is arranged so that all the radio communication functions provided by the firmware module are invoked by supervisor call instructions having respective supervisor call numbers according to a predetermined correspondence between numbers and functions. In this way, no other mechanism for invoking firmware functions need be supported by the device, thereby avoiding substantial static or run-time link dependencies, and simplifying the device and development of the software application.

It will be appreciated that the firmware module may provide other functions, not necessarily related to radio communication, which the software application can invoke; for example, an encryption algorithm. Preferably the device is configured so that the invoking of all such functions is carried out by the issuing of supervisor call instructions.

Because embodiments of the device need not contain a traditional, full operating system, the application developer can be free to develop the software application as a native application for the processor architecture, without having to learn how to interface with a proprietary operating system supplied by the chip manufacturer. Especially when the processor is well-known in the art, this is a particularly attractive feature for the application developer.

If the device has a hardware abstraction layer in addition to the firmware module, the software application may interface directly with this layer. Application-specific drivers may also be loaded onto the device.

Configuring the device may comprise using the correspondence between supervisor call numbers and radio communication functions when compiling the software application. Compiling or loading the software application may make use of the predetermined software-application memory address. In some embodiments, configuring the device may comprise receiving the correspondence between supervisor call numbers and radio communication functions and/or receiving the predetermined software-application memory address, e.g. as a header file. Such information may then be used when compiling the software application.

The device is preferably configured so that no run-time linking is required when executing the software application on the device.

The processor may implement the supervisor call instructions in any appropriate way. In one set of preferred embodiments, the processor is an ARM Ltd.® processor, such as a processor from the Cortex-M family, and the supervisor call instructions are then SVC instructions, supported by the processor.

The software application may issue a supervisor call instruction by executing a dedicated SVC processor instruction. Such an instruction may be generated by a compiler when compiling the software application, e.g. by the developer including a specific pre-processor directive in the source code for the software application.

The number associated with the supervisor call may be made available to the call handler via a register or via the call stack or via any other appropriate mechanism.

Preferably, the processor and/or software application are configured to make the values of one or more arguments available to the supervisor call handler. In this way, the software application can pass arguments to a radio communication function, such as data to be transmitted. The call handler may be able to pass a return value from the radio communication function to the software application.

The processor is preferably configured to handle a supervisor call instruction from the software application as an exception (software interrupt). In this way, the software application can interrupt less time-critical processing when a time-critical radio communication function needs to be invoked.

The processor preferably supports a plurality of interrupt priorities. In some embodiments, some event-driven functions in the firmware module are assigned a relatively high priority, while others are assigned a relatively low priority. Preferably, functions associated with time-critical radio communication operations are assigned the relatively high priority.

The software application may be arranged to handle interrupts (forwarded by the firmware module, as explained below) and may have a relatively high priority for some event-driven functions and a relatively low priority for others. The software application priorities are preferably interleaved with those of the firmware module. The highest firmware priority level is preferably higher than the highest software-application priority level, so that critical radio communication operations, implemented in the firmware module, can always take precedence over the software application. This can provide protection against careless programming in the software application.

The firmware module is preferably configured to invoke a function in the software application in response to the firmware module receiving an interrupt. Such an interrupt may arise, for example, from a peripheral, such as a movement sensor.

The firmware module and the software application may each have a respective interrupt vector table. The two tables preferably use the same interrupt-vector-address offsets as each other. The offsets of interrupt vector addresses in the firmware module's vector table (and hence the software application's vector table, when the two use the same offsets) are typically fixed by the processor architecture. The device is preferably configured to use the firmware module's vector table when processing an interrupt (i.e. as the system interrupt vector table).

However, the firmware module is preferably configured so that all interrupts that the firmware module is not programmed to handle itself are passed on to the software application. This may be implemented by the firmware module causing execution to branch to the address contained in the corresponding offset in the software application's vector table whenever it is not configured to handle a particular interrupt. This is possible because the software application is loaded to a predetermined memory address, so that the firmware module can know, in advance, where to find the software application's vector table once the application has been loaded onto the device.

For example, in some embodiments the RESET interrupt handler address is always placed at offset=0 by the compiler. Therefore, the RESET handler address in the firmware module's vector table will be at address 0x0000 0000+0=0x0000 0000 in the memory. The RESET handler address in the software application's vector table is at address CLENR0+0=CLENR0, where CLENR0 is the predetermined base memory address at which the software application is located.

This interrupt forwarding mechanism conveniently allows the software application to be programmed to handle hardware interrupts in substantially the same way as if no firmware module were present on the device. I.e. the firmware module can be invisible to the software application for the purposes of receiving interrupts. The forwarding is preferably implemented in such a way that it adds latency of fewer than about 30 instructions or less than about 3 microseconds, compared with a direct hardware interrupt to a software application.

The firmware module may be arranged to be substantially disabled. Such disabling may be carried out via a call to the firmware module (preferably using the SVC mechanism). Disabling the firmware module may cause the firmware module to reset the protocol stack and to disable any memory protection (if present) in order to give resources back to the software application. When disabled, the firmware module preferably forwards all interrupts to the software application (even those which it might otherwise have handled itself).

The processor preferably supports seamless transitions from one interrupt priority level to another. This is sometimes referred to as tail-chaining. This provides an elegant means of transferring control between the software application and the firmware module (and vice versa) so as to allow time-critical radio communication functions to take precedence when necessary.

The device preferably comprises memory protection logic arranged to intercept memory access instructions. This logic may be located between the processor and the memory. It may use the location of a memory-access instruction (i.e. where the processor has read the instruction from) to determine whether to allow access. The memory protection logic is preferably configured to prevent the software application from reading or overwriting the firmware module (or both).

Such memory protection can provide benefits in protecting sensitive information in the firmware module from being read by the developer of the software application. It can also minimise potential damage from programming errors in the software application, as well as aiding the detection and correction of bugs in the software application.

The memory protection logic may be configured to protect RAM associated with the firmware module from being read or written to by the software application (or both).

The processor, memory, and radio communication logic are preferably integrated on a single silicon chip. However, they may alternatively be integrated in a multi-chip module.

The memory is preferably a non-volatile memory such as EEPROM or flash. It preferably supports random-access reading, so that the firmware module and software application can be executed directly from the memory.

The skilled person will appreciate that the device will typically also comprise volatile memory. It may additionally comprise one or more peripherals. It may have connections for receiving power and a clock signal. It may have a connection for an antenna. It may have one or more input and/or output interfaces such as a serial connection.

Optional or preferred features of one aspect or embodiment described herein may, wherever appropriate, be applied to any other aspect or embodiment.

Certain preferred embodiments of the invention will now be described, by way of example only, with reference to the accompanying drawings, in which.

Figure 1:
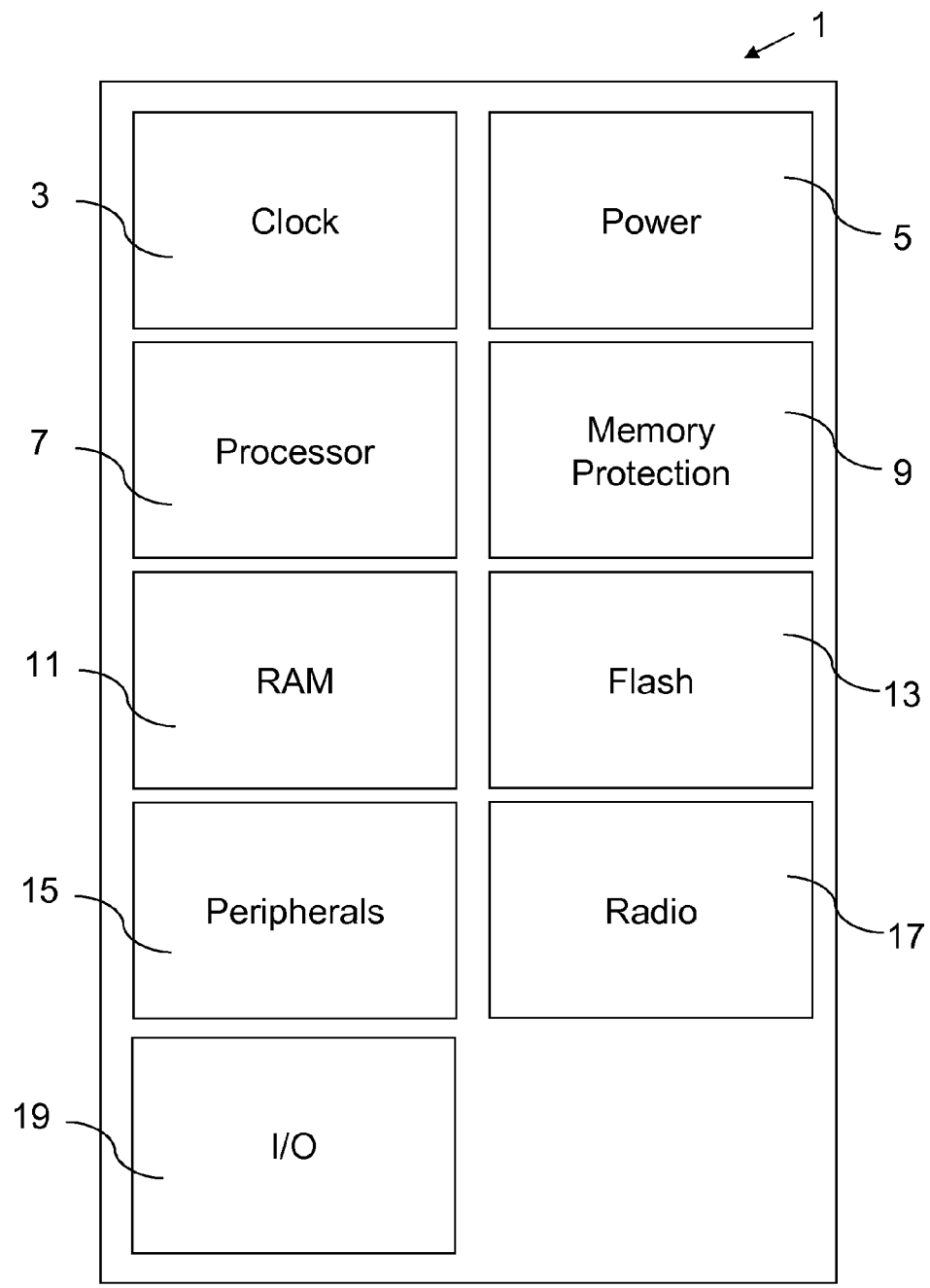
FIG. 1 is a schematic drawing of a microcontroller embodying the invention.

FIG. 1 shows an integrated-circuit microcontroller 1, sometimes known as a system-on-chip, which comprises clock logic 3, which may include a resistor-capacitor oscillator and/or may receive an input from an off-chip crystal oscillator (not shown), power management circuitry 5, a processor 7 (e.g. an ARM® Cortex-M0), memory protection logic 9, RAM 11, non-volatile flash memory 13, one or more peripherals 15, radio communication logic 17 and input/output circuitry 19.

These components are interconnected in a conventional manner, e.g. using lines and buses (not shown). The memory protection logic 9 is situated so as to intercept instructions from the processor 7 to the RAM 11 and flash memory 13. When installed in a product, the microcontroller 1 may be connected to a number of external components such as a power supply, radio antenna, crystal oscillator, sensors, output devices, etc.

Figure 2:
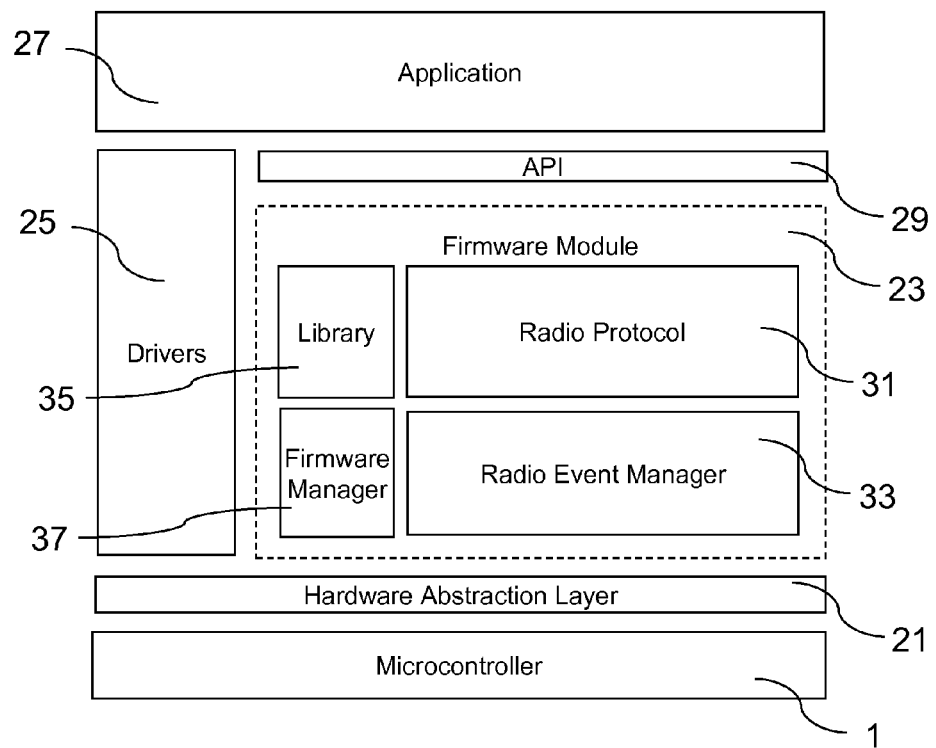
FIG. 2 is a schematic drawing showing major software components within the microcontroller architecture.

FIG. 2 shows the microcontroller 1, above which sits an optional hardware abstraction layer 21, such as the ARM® Cortex Microcontroller Software Interface Standard. The architecture also includes a firmware module 23, drivers 25 and software application 27. The drivers 25 may be specific to the software application 27.

The firmware module 23 is a binary application comprising a number of embedded software blocks. A radio protocol block 31 implements one or more wireless protocol stacks. A radio event manager 33 provides access scheduling for the radio communication logic 17 and event multiplexing. A library 35 provides shared hardware resource management and functions such as random number generation, configuring interrupts and priority, power management (e.g. for enabling and disabling peripherals), encryption functions, etc. A firmware manager 37 supports enabling and disabling the firmware module, and enabling and disabling the wireless protocol stack.

The firmware module 23 owns the system vector table and is the entry point for the program on all resets.

An application programming interface (API) 29 for the firmware module 23 allows the software application 27 to invoke functions in the firmware module 23. It is implemented entirely using system calls. When using an ARM® processor, each API function prototype is mapped to a firmware function via an associated supervisor call (SVC) number at compile time. This mapping can be provided to the developer of the software application 27 to allow the functions to be called correctly.

The firmware module 23 can communicate events to the software application 27 as software interrupts, the content of which is buffered until read (polled) by the software application 27. The reading is done through an API call (e.g. event_get( )).

The software application 27 can access the microcontroller (1) hardware directly or via a hardware abstraction layer 21, e.g. by means of application-specific drivers 25, in addition to being able to use the firmware module 23 to use the hardware indirectly.

Figure 3:
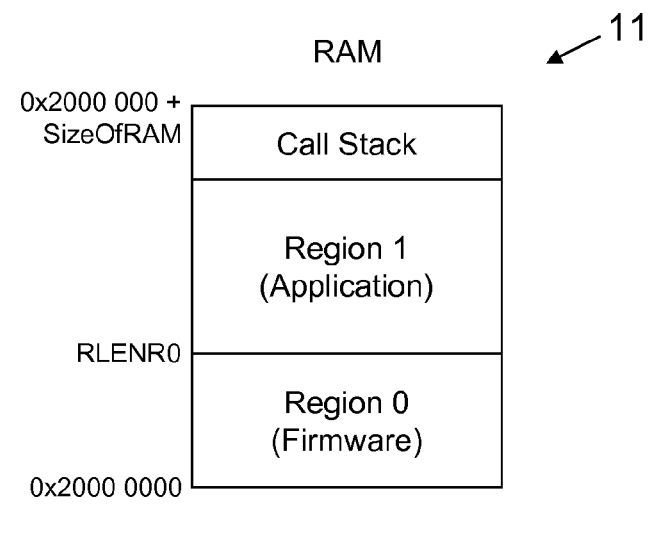
FIG. 3 is a schematic memory map for the microcontroller.
Figure 3:
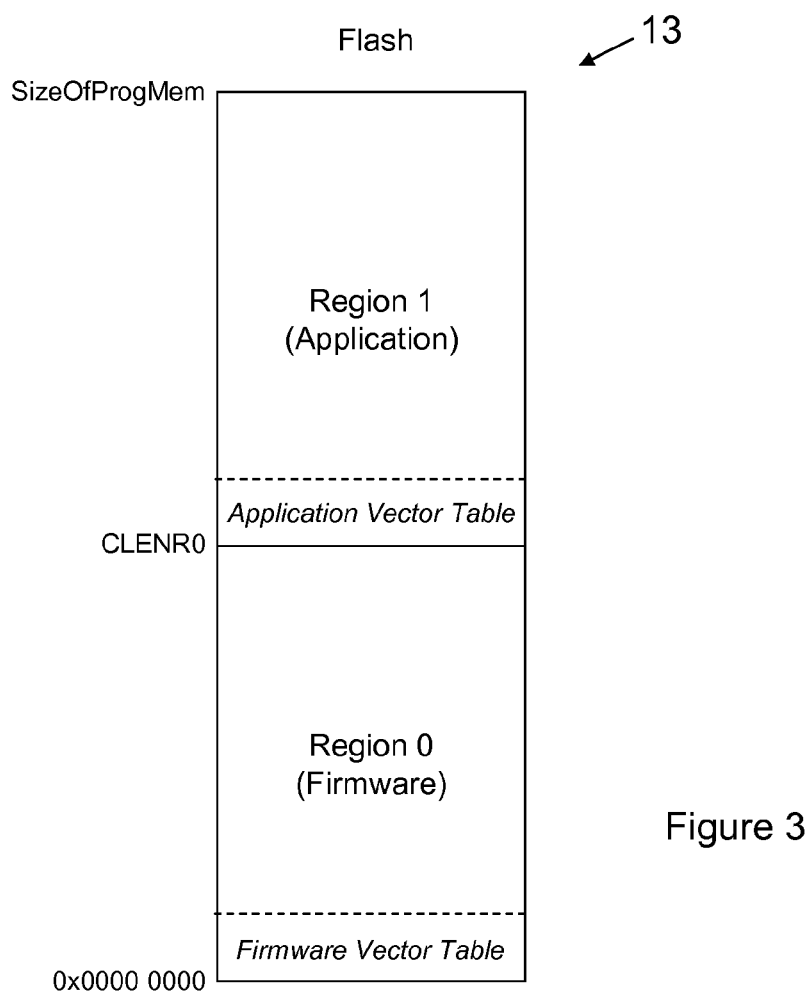

FIG. 3 shows how the RAM 11 and flash 13 are shared between the firmware module 23 and the software application 27 (including any application-specific drivers 25). When using an ARM® Cortex-M0 processor 7, the flash 13 is assigned addresses from zero (0x0000 0000) upwards, to its capacity, SizeOfProgMem and the RAM 11 is assigned addresses from 0x2000 0000 upwards to (0x2000 0000+SizeOfRAM). Different address values may be used if a different type of processor is used.

The flash 13 comprises two distinct regions either side of address CLENR0 (code length region 0). Region 0, between zero and CLENR0, is where the firmware module 23 is loaded. Its interrupt vector table is stored at address zero. Region 1, extending upwards from CLENR0, is where the software application 27 is loaded. It too has an interrupt vector table, at address CLENR0, the purpose of which is explained below. It will be appreciated that the device 1 may have other non-volatile memory (not shown) which may be used for other purposes, such as storing configuration information or flags.

The RAM 11 similarly has a Region 0, from the base address 0x2000 000 to RLENR0, and a Region 1, extended upwards from RLENR0. RAM Region 0 provides data storage for the firmware module 23 while RAM Region 1 provides data storage for the software application 27. A call stack is shared between the firmware module 23 and the software application 27 and grows downwards, e.g. from 0x2000 0000+SizeOfRAM. The memory allocated to the call stack must be big enough for the needs of both the software application 27 and the firmware module 23.

The firmware module 23 call-stack usage requirement may be published for the device 1 by the chip manufacturer. The developer of the software application 27 must then define an initial stack pointer and reserve sufficient stack memory for both the firmware module 23 and his software application 27. The firmware module 23 will initialize the main stack pointer on reset.

The memory protection logic 9 is arranged to intercept all memory access requests (e.g. read requests) from the processor 7 to the flash 13 and the RAM 11. It determines the source of the access request instruction (e.g. whether the request is from the firmware module 23 or from the software application 27). It also accesses memory protection configuration data (e.g. stored in one or more dedicated registers) which specifies respective access permissions for the various sources, and allows or denies the access request accordingly.

In some preferred embodiments of the invention, the software application 27 is denied read and/or write access to flash Region 0 and to RAM Region 0. This protects confidentiality for the firmware module 23 and can prevent inadvertent or malicious writing by the software application 27 to memory locations allocated to the firmware module 23, thereby increasing robustness and security. The software application flash Region 1 may also be protected from read access, e.g. to protect against read back via an external debugging interface.

This means that the initial stack pointer cannot be in RAM Region 0 as the software application 27 does not have write access to this region. In other embodiments of the invention, the call stack may be in two parts, where the firmware module 23 call stack is located in RAM Region 0 and the software application 27 call stack is located in RAM Region 1.

Figure 4:
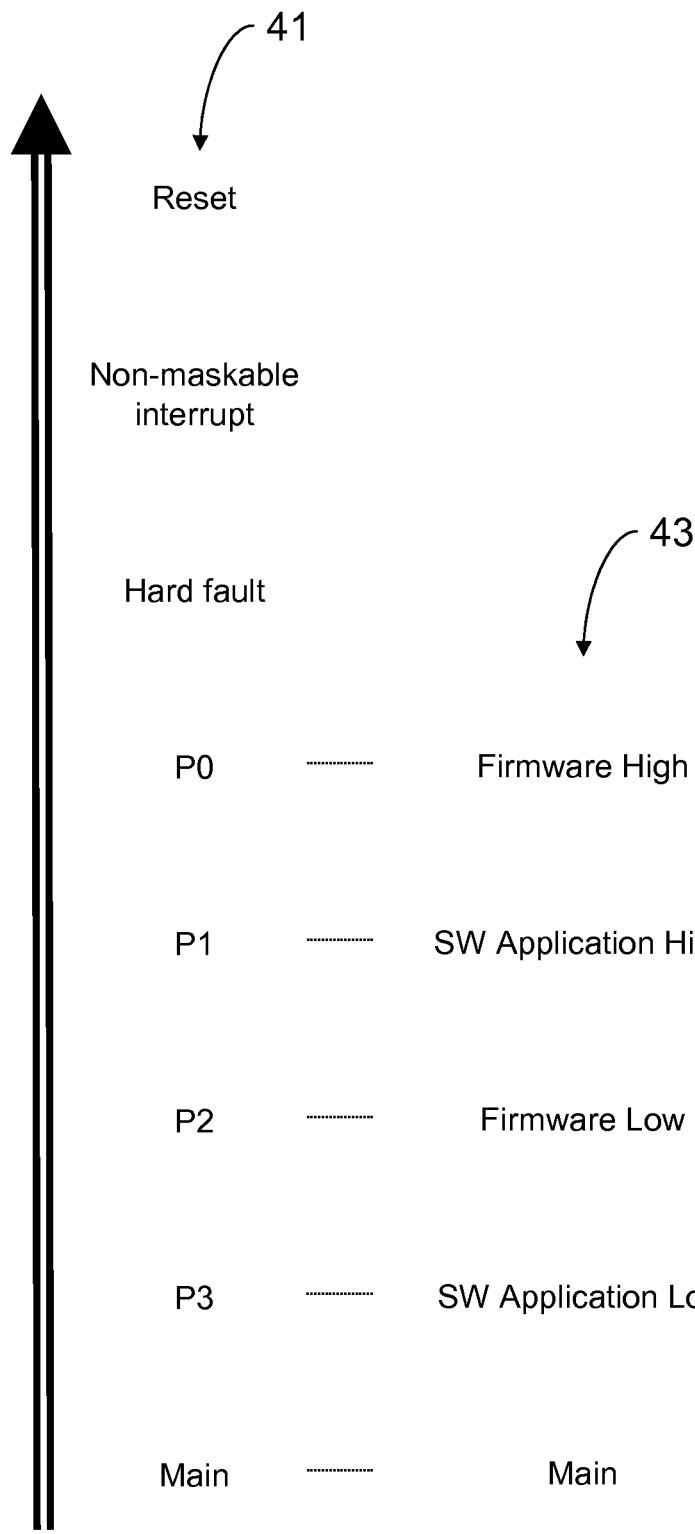
FIG. 4 is a figurative diagram of different processor interrupt priority levels.

FIG. 4 shows the different interrupt levels 41 provided by an ARM® Cortex-M0 processor, with increasing priority in the direction of the arrow, and how these levels are mapped to the interrupt levels 43 used by the firmware module 23 and software application 27.

Above the Main background context are four interrupt priorities which are used as follows, in increasing order of priority: software application low priority, firmware module low priority, software application high priority and firmware module high priority. The high-priority software application interrupt is used for critical interrupts where low latency is required.

Figure 5A:
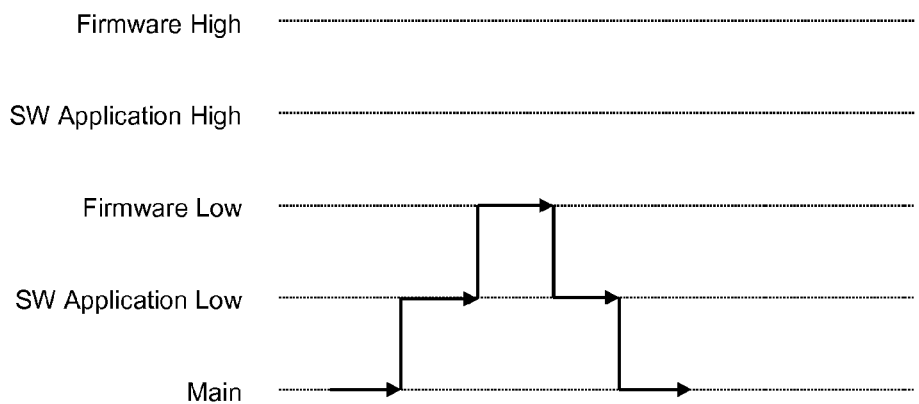
FIGS. 5a-5c are figurative diagrams illustrating various interrupt scenarios.
Figure 5B:
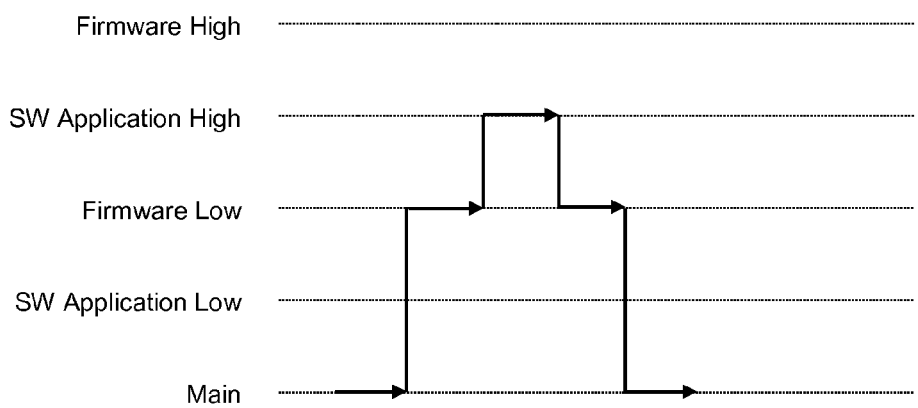
Figure 5C:
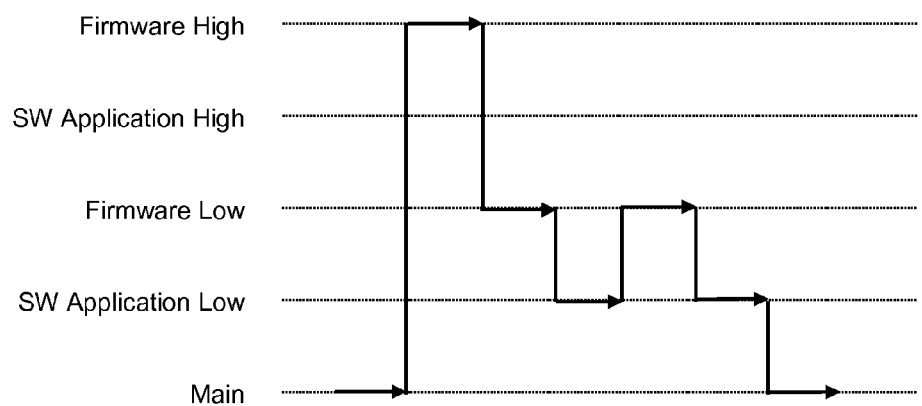

FIGS. 5a-5c show various examples of possible changes in priority level.

FIG. 5a illustrates a background main process being interrupts by the software application at low priority, e.g. by a serial driver. The software application 27 then makes an API call to the firmware module 23 (by triggering an supervisor call (SVC) exception). The firmware module 23 handles the call at the low-priority firmware level before returning to the application low-priority level. Finally, the software application 27 completes its operation and execution returns to the main background level.

FIG. 5b illustrates an API call to the firmware module 23 being made from the main context (by triggering an SVC exception). The execution of the API function in firmware low-priority is interrupted by a high-priority software application exception. This may be to service a sensor input, for example. Once the software application finishes its high-priority execution, the firmware API call can continue at the lower priority level, before finally returning to the background main process.

FIG. 5c illustrates a high-priority interrupt of a background main process by the firmware module 23. This could be due to a time-critical radio communication interrupt, such as an incoming radio packet, to which the radio event manager 33 must respond. The interrupt service routine in the firmware module 23 sets a low-priority firmware exception flag to signal to the higher levels of the radio protocol stack. On completion of the high-priority routine, the low-priority routine is executing immediately due to the tail-chaining capabilities of the processor 7 (i.e. without having to revert to the background main level in between). The low-priority firmware routine in turn sets an exception flag to signal the software application 27 that a radio data packet has been received. This exception is chained after completion of the low-priority firmware module routine. In this example, the software application 27 then makes an API call to the firmware module 23 via an SVC which completes and returns context from the SVC to the software application 27. Finally, the software application low-priority operation completes and execution returns to the main level.

Figure 6:
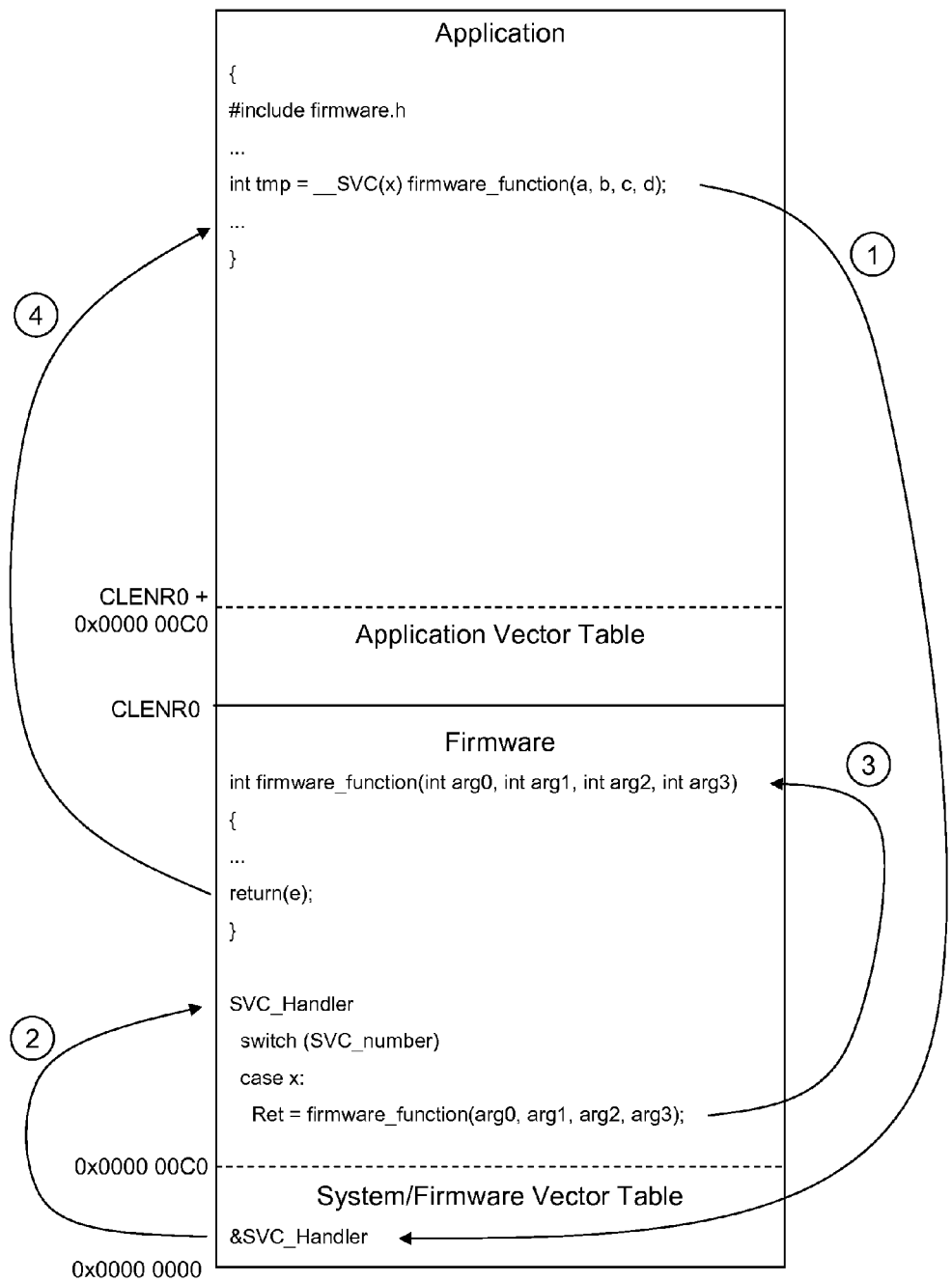
FIG. 6 is a figurative diagram of source code elements illustrating the software application calling a function in the firmware module.
Figure 7:
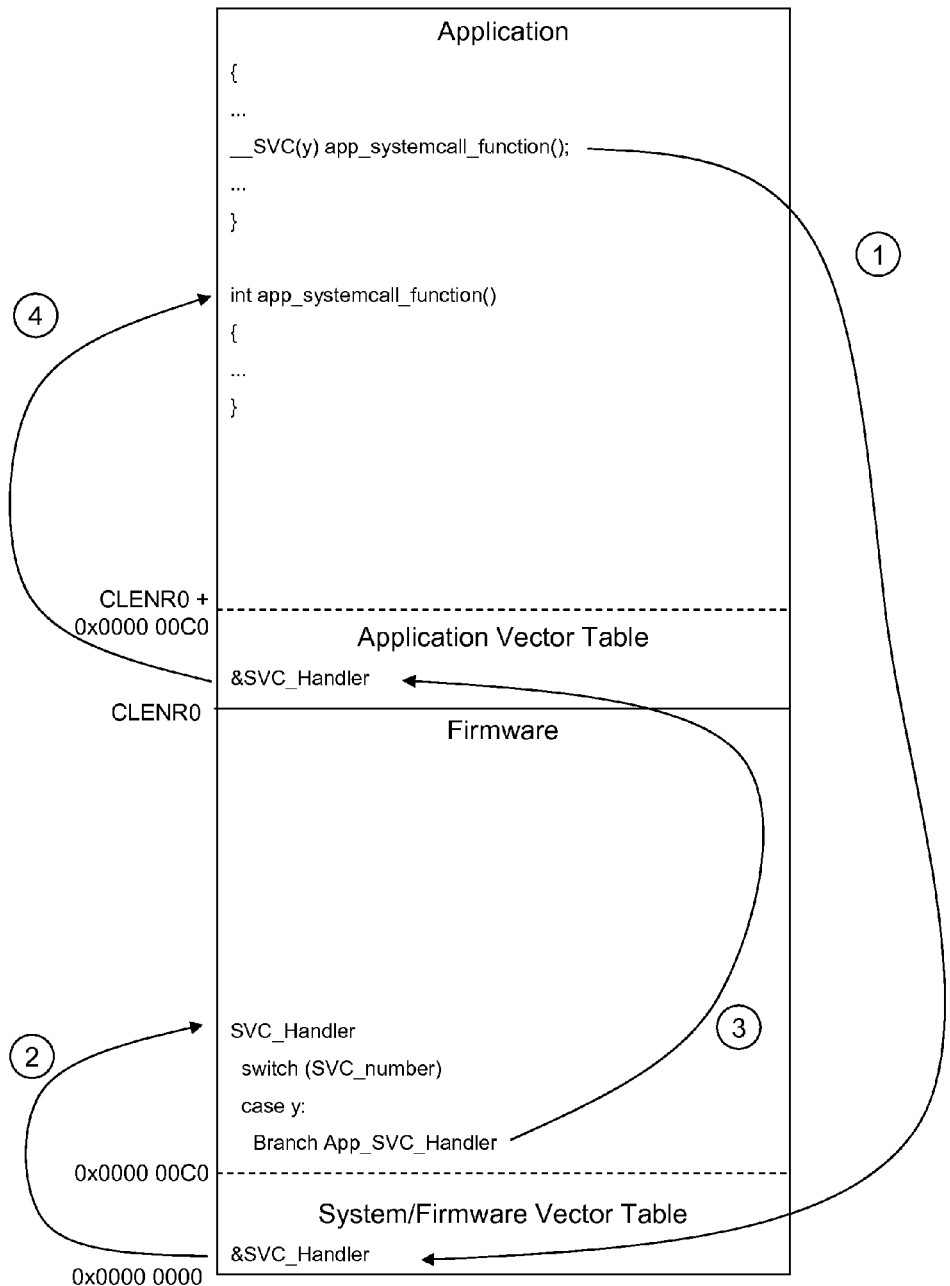
FIG. 7 is a figurative diagram of source code elements illustrating the software application using a system call to invoke an internal function.
Figure 8:
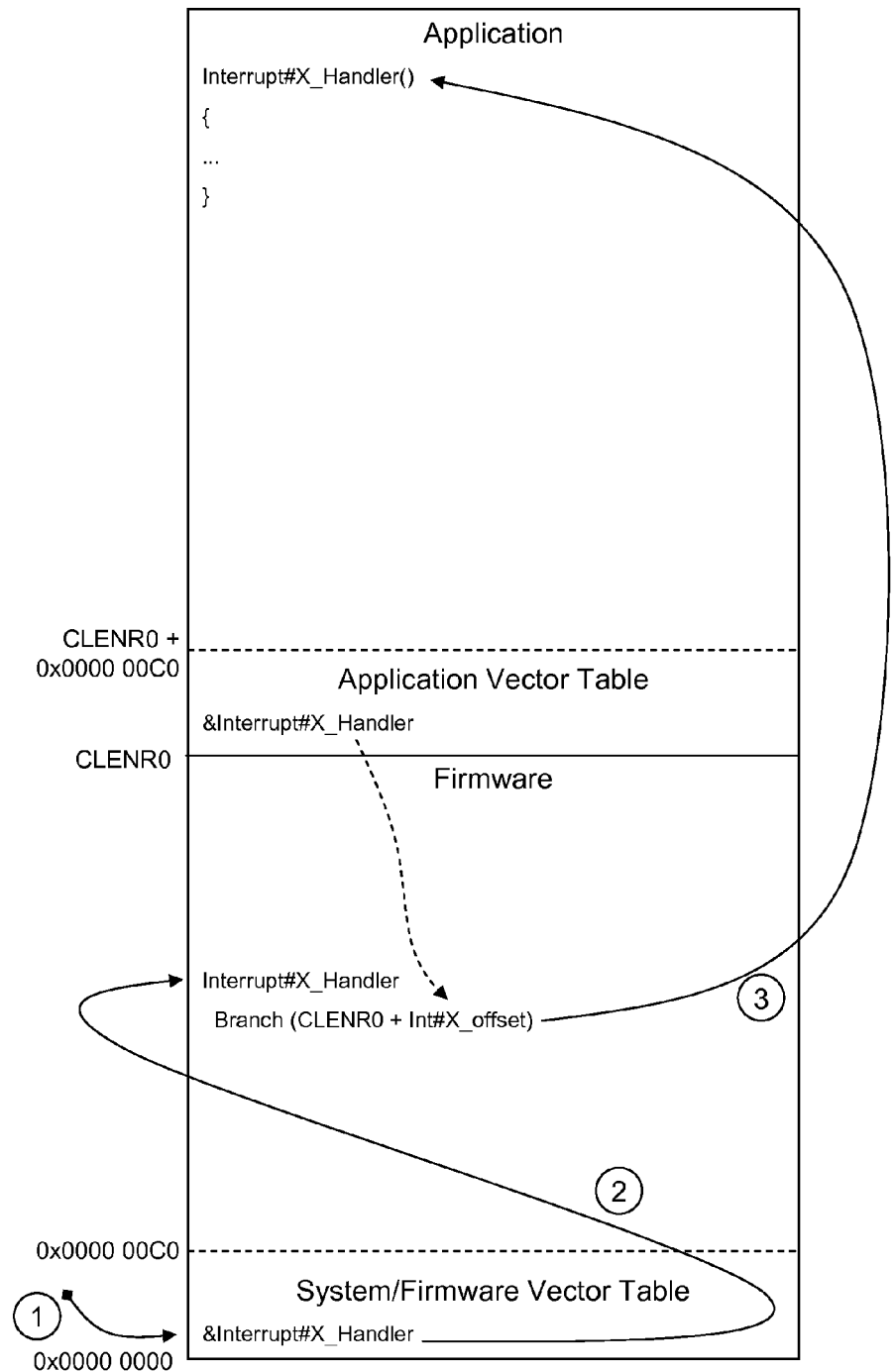
FIG. 8 is a figurative diagram of source code elements illustrating the software application receiving a hardware interrupt.

FIGS. 6-8 illustrate by example how control can pass between the software application 27 and the firmware module 23. Uncompiled C language code extracts are used for illustration. Of course, in reality, binary instructions from the flash memory 13 are executed by the processor 7. The numbered arrows indicate successive execution steps.

FIG. 6 shows the software application 27 calling a function through the API 29 of the firmware module 23. The application 27 calls a function with a prototype imported from the firmware API 29 using a firmware header file supplied to the software-application developer by the chip manufacturer. The _SVC(x) pragma causes the compiler to insert an instruction in the object code which causes a supervisor call (SVC) exception when the function is called by the software application 23.

The processor 7 invokes the SVC handler via the firmware module's interrupt vector table (which acts as the system interrupt vector table). The SVC number associated with the function called by the software application 27 is passed to the SVC handler, along with any arguments. Such arguments may be passed via registers or via the call stack, depending on the processor. The SVC handler uses the SVC number to call the correct firmware module function. This could be a radio control function (e.g. an instruction to transmit data by radio), or a firmware management function (e.g. to disable the firmware module), or a library function (e.g. to generate a random number). The function executes and then returns to the software application 27. A return value may be available in a register or on the call stack.

FIG. 7 shows the software application 27 invoking one of its own functions via a system call. It might do this in order to change from a low priority to a high priority execution level. Similarly to the situation in FIG. 6, the software application 27 triggering a SVC so as to cause execution to pass to an SVC handler in the firmware module 27. However, in this case, the instruction uses an SVC number in a range that is reserved for the software application's own use. The firmware module 23 thus causes execution to branch to a handler function (app_systemcall_function( )) in the software application 27, potentially at a different priority level to that of the preceding operation.

FIG. 8 shows how a hardware interrupt can be received by the software application 27. The firmware module 23 is arranged to forward interrupts to the software application 27 by default, unless they are interrupts that the firmware module 23 is configured to handled. Additionally, if the firmware module 23 has been disabled by the software application 27 (e.g. via a suitable API call to the firmware manager 37), then the firmware module will forward all interrupts to the software application 27.

On receiving an interrupt, e.g. from a motion sensor, an interrupt handler in the firmware module 23 is vectored to. This checks whether the firmware module 23 is enabled and whether it is an interrupt that the firmware module 23 is set up to deal with. If so, the firmware module 23 handles the interrupt. If not, it branches execution to an interrupt handler routine in the software application 27. The firmware module 23 can know where to find this routine because the location of the software application vector table (at CLENR0) is predetermined, and the offsets into this vector table are the same as the offsets into the firmware module's vector table.

In this way, a firmware module implementing radio control logic, programmed to a firmware memory address on an integrated radio communication chip, can be configured and used both securely and conveniently.

The invention claimed is:

1. An integrated-circuit radio communication device, wherein:
the device comprises a processor, memory, and radio communication logic;
the memory has a firmware module stored at a firmware memory address, the firmware module comprising instructions for controlling the radio communication logic according to a predetermined radio protocol;
the processor is configured to receive supervisor call instructions, each having an associated supervisor call number, and to respond to a supervisor call instruction by (i) invoking a supervisor call handler in the firmware module, and (ii) making the supervisor call number available to the call handler;
the memory has a software application stored at a predetermined application memory address, the software application being arranged to invoke a radio communication function from the firmware module by issuing a supervisor call instruction having an associated predetermined supervisor call number corresponding to the function to be invoked;

the processor supports a plurality of interrupt priorities;

the processor is configured to handle supervisor call instructions from the software application as exceptions;

some functions in the firmware module are assigned a relatively high priority, with other functions in the firmware module having a relatively low priority;

the software application is arranged to handle interrupts, assigning a relatively high priority to some event-driven functions, and a relatively low priority to other event-driven functions; and the high and low software application priorities are interleaved with the high and low firmware module priorities.

2. The device of claim 1, wherein the firmware module is arranged so that all radio communication functions provided by the firmware module are invoked by supervisor call instructions having respective supervisor call numbers, according to a predetermined correspondence between numbers and functions.

3. The device of claim 1, wherein the firmware module is arranged so that all functions provided by the firmware module are invoked by the issuing of supervisor call instructions.

4. The device of claim 1, configured so that no run-time linking is required when executing the software application on the device.

5. The device of claim 1, wherein the software application is arranged to issue a supervisor call instruction by executing a dedicated SVC processor instruction.

6. The device of claim 1, wherein the processor and/or software application are configured to make the values of one or more arguments available to the supervisor call handler.

7. The device of claim 1, wherein the highest firmware priority level is higher than the highest software-application priority level.

8. The device of claim 1, wherein the firmware module is configured to invoke a function in the software application in response to the firmware module receiving an interrupt.

9. The device of claim 1, wherein the firmware module and the software application each has a respective interrupt vector table, wherein the device is configured to use the vector table of the firmware module when processing an interrupt, and wherein the firmware module is configured so that all interrupts that the firmware module is not programmed to handle itself are passed on to the software application.

10. The device of claim 9, wherein, for at least one interrupt, an offset to a handler for said interrupt within the interrupt vector table of the software application is equal to an offset to a handler for said interrupt within the interrupt vector table of the firmware module.

11. An integrated-circuit radio communication device, wherein:

the device comprises a processor, memory, and radio communication logic;

the memory has a firmware module stored at a firmware memory address, the firmware module comprising protocol stack instructions for controlling the radio communication logic according to a predetermined radio protocol;

the processor is configured to receive supervisor call instructions, each having an associated supervisor call number, and to respond to a supervisor call instruction by (i) invoking a supervisor call handler in the firmware module, and (ii) making the supervisor call number available to the call handler;

the memory has a software application stored at a predetermined application memory address, the software application being arranged to invoke a radio communication function from the firmware module by issuing a supervisor call instruction having an associated predetermined supervisor call number corresponding to the function to be invoked; and the firmware module can be substantially disabled via a call to the firmware module, so as to cause the firmware module to reset the protocol stack and to disable any memory protection in order to give resources back to the software application, and wherein, when disabled, the firmware module will forward all interrupts to the software application.

12. The device of claim 1, wherein the processor supports seamless transitions from one interrupt priority level to another.

13. The device of claim 1, comprising memory protection logic arranged to intercept memory access instructions and being configured to prevent the software application from reading or overwriting the firmware module and/or from reading or writing to RAM associated with the firmware module.

14. A non-transient, tangible medium containing a firmware module for loading on an integrated-circuit radio communication device comprising a processor, memory, and radio communication logic, at a firmware memory address, wherein the firmware module comprises:

protocol stack instructions for controlling the radio communication logic according to a predetermined radio protocol;

a supervisor call handler arranged to respond to a supervisor call instruction being issued by a software application by performing a radio communication function corresponding to a supervisor call number associated with the supervisor call instruction;

instructions for responding to a call to disable the firmware module, by resetting the protocol stack and disabling any memory protection in order to release resources; and instructions for forwarding all interrupts to the software application when the firmware module is disabled.

15. The non-transient, tangible medium of claim 14, wherein the firmware module is a linked binary module.

16. The device of claim 11, wherein the firmware module is arranged so that all radio communication functions provided by the firmware module are invoked by supervisor call instructions having respective supervisor call numbers, according to a predetermined correspondence between numbers and functions.

17. The device of claim 11, wherein the firmware module is arranged so that all functions provided by the firmware module are invoked by the issuing of supervisor call instructions.

18. The device of claim 11, configured so that no run-time linking is required when executing the software application on the device.

19. The device of claim 11, wherein the software application is arranged to issue a supervisor call instruction by executing a dedicated SVC processor instruction.

20. The device of claim 11, wherein the processor and/or software application are configured to make the values of one or more arguments available to the supervisor call handler.

21. The device of claim 11, wherein the firmware module is configured to invoke a function in the software application in response to the firmware module receiving an interrupt.

22. The device of claim 11, wherein the firmware module and the software application each has a respective interrupt vector table, wherein the device is configured to use the vector table of the firmware module when processing an interrupt, and wherein the firmware module is configured so that all interrupts that the firmware module is not programmed to handle itself are passed on to the software application.

23. The device of claim 22, wherein, for at least one interrupt, an offset to a handler for said interrupt within the interrupt vector table of the software application is equal to an offset to a handler for said interrupt within the interrupt vector table of the firmware module.

\* \* \* \* \*